United States Patent Office 2,951,847
Patented Sept. 6, 1960

2,951,847

DIAZACYANINE DYESTUFFS CATIONS

Hans Baumann and Dieter Leuchs, Ludwigshafen (Rhine), Germany, assignors to Badische Anilin- & Soda-Fabrik Aktiengesellschaft, Ludwigshafen (Rhine), Germany No Drawing. Filed Sept. 23, 1958, Ser. No. 762,713

Claims priority, application Germany Oct. 24, 1957

6 Claims. (Cl. 260—305)

This invention relates to new diazacyanine dyestuff cations.

The new dyestuff cations have the general formula:

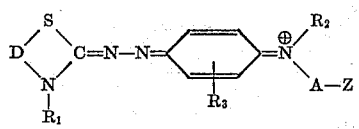

in which D represents an atomic bridge which completes the heterocyclic ring to form a thiazole or benzthiazole, $R_1$ represents a low molecular weight aliphatic radical, $R_2$ represents a hydrogen atom or an aliphatic or aromatic radical, $R_3$ represents a hydrogen atom or a low molecular weight alkyl radical, A represents a divalent aliphatic, aromatic or aliphatic-aromatic radical which may also contain hetero atoms and Z represents an amino group.

The new dyestuff cations are derived from thiazoles or benzthiazoles. They have as a common feature an amino group Z which is situated outside the color-producing system. This amino group Z may be a primary, secondary or tertiary group with aliphatic radicals with up to 5 carbon atoms, a mono-, di- or hydroxy-alkyl-amino group or a heterocyclic amino group, such as a mono- or di-methylamino group, a diethylamino, methyl-hydroxyethylamino, methylpropylamino, pyrrolidino, piperidino or morpholino group.

The other substituents indicated in the general formula may be considerably varied without departing from the scope of the invention. Thus the radical $R_1$ may be an alkyl group with up to 5 carbon atoms, such as a methyl, ethyl or butyl group. $R_2$ may be a hydrogen atom, an unsubstituted or substituted hydrocarbon radical, for example an aliphatic radical with up to 5 carbon atoms or an aromatic radical with up to 10 carbon atoms, the unsubstituted or substituted component of a heterocyclic ring, such as a methyl, ethyl, propyl, hydroxyalkyl, such as hydroxyethyl or hydroxyamyl radical, a phenyl radical, an alkylphenyl, a hydroxyphenyl radical or the saturated part of a 1,2,3,4-tetrahydroquinoline or hydroxy-tetrahydroquinoline radical. The symbol $R_3$ stands for a hydrogen atom or an alkyl radical with up to 4 carbon atoms, such as a methyl or ethyl radical. The divalent radical A, which separates the amino group Z from the color-producing system, may also be of quite different nature. Thus A can be an unsubstituted or substituted alkylene radical with up to 5 carbon atoms, a hydroxy-alkylene radical with up to 5 carbon atoms, the divalent radical of an alipahtic ether with up to 6 carbon atoms, an unsubstituted or substituted arylene radical with up to 10 carbon atoms, an aralkylene radical with up to 10 carbon atoms, a radical in which an unsubstituted or substituted alkylene group with up to 4 carbon atoms is connected through a hetero atom, a carboxylic acid ester or a carboxylic acid amide group with an arylene group, such as an ethylene, propylene, amylene, hydroxypropylene, hydroxybutylene or phenylene radical, a radical of the formula $-CH_2-CH_2-O-CH_2-CH_2-$

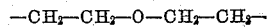

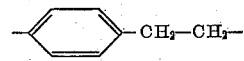

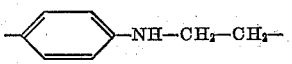

or

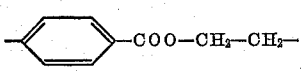

The rings of the new dyestuff cations may contain one or more mainly neutral substituents, such as alkyl groups, aryl groups, alkylamino, arylamino, acylamino, alkyl ether, alkylsulfone, sulfonic acid dialkylamido, carboxylic acid ester, carboxylic acid amido or cyano groups and/or halogen atoms.

The new diazacyanine dyestuff cations may be prepared by known methods. Two methods are suitable above all:

The first comprises the treatment of hydrazones of thiazolones-(2) or benzthiazolones-(2) which have been alkylated on nitrogen and aromatic amines capable of coupling in a neutral to acid aqueous solution (pH 7 to 2) at temperatures of 0° to 50° C. with oxidizing agents, such as atmospheric oxygen, hydrogen peroxide, hypochlorites, persulfates, perborates, ferric, cupric, mercuric and ceric salts of ferricyanides. The two components are thereby oxidatively united to form the dyestuff cation:

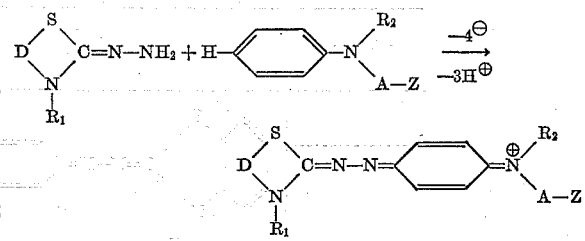

Instead of the free hydrazones and amines, their more stable mineral acid salts may be used.

The diazacyanine dyestuff cations can be precipitated from their solution in the form of salts with inorganic or organic anions by acidification.

Hydrazones suitable for the production of the new dyestuff cations according to this process are for example 3 - methyl - 4 - phenylthiazolone - (2)-hydrazone-, 3 - methylbenzthiazolone - (2) - hydrazone, 3 - ethylbenz-thiazolone - (2) - hydrazone, 3 - methyl - 6 - methoxy-benzthiazolone - (2) - hydrazone, 3 - methyl - 6 - chlor-benzthiazolone - (2) - hydrazone, 3 - methyl - 6 - phenyl-aminobenzthiazolone - (2) - hydrazone, 3 - methyl - 6-acetylaminobenzthiazolone-(2)-hydrazone.

As amines capable of coupling there may be used for example N.N - dimethyl-N'-(3 - methylphenyl)ethylene diamine, N.N-diethyl-N'-(3-methoxyphenyl)-ethylene diamine, N.N-dimethyl-N'-phenylethylene diamine, N.N.N'-triethyl-N'-phenylethylene diamine, N.N-di-beta-hydroxy-ethyl - N' - methyl-N'-phenylethylene diamine, N.N-di-methyl-N'-beta-hydroxyethyl-N'-phenylethylene diamine, N.N-dimethyl - N' - beta - hydroxyethyl-N'-phenyl-1.3-diaminopropane, N.N-dimethyl-N'-ethyl-N'-phenyl 1.3-diaminopropanol-2, N-butyl - N - (beta-piperidinoethyl)-3-amino - 1 - methylbenzene, N-(beta-diethylaminoethyl)-diphenylamine, N-(beta - dimethylaminoethyl)-4-ethoxydiphenylamine, 4-((beta-dimethylaminoethyl) - amino)-diphenylamine, 1-(gamma-aminopropyl)-2-phenylindole, 1-(gamma-aminopropyl)-1.2.3.4-tetrahydroquinoline.

In the second method for the production of the new diazacyaninedye stuff cations, a 2-aminothiazole which is not substituted on the ring nitrogen atom is first diazotized by known methods and coupled with the above-mentioned amines capable of coupling, to form an azo dyestuff. This azo dyestuff is then alkylated at temperatures of 10° to 130° C., especially 30° to 80° C., on the nitrogen atom of the thiazole ring with an alkylating agent and the new diazacyanine dyestuff cation thus obtained.

As diazotizable 2-aminothiazoles there may be mentioned: 2-aminothiazole, 2-amino-4.5-dimethylthiazole, 2-amino-4-phenylthiazole, 2-amino - 4 - (3'-nitrophenyl)-thiazole, 2-amino - 5 - nitrothiazole, 2-amino-5-cyanothiazole, 2-amino-6-methyl-benzthiazole, 2-amino-6-methoxybenzthiazole, 2-amino-6-ethoxybenzthiazole, 2-amino-4-methyl-6-chlorbenzthiazole.

Suitable alkylating agents are for example alkyl halides, dialkyl sulfates or alkyl esters of organic sulfonic acids, such as methyl bromide, ethyl chloride, dimethyl sulfate, diethyl sulfate and methyl-para-toluene sulfonate.

The diazacyanine dyestuff cations have good solubility in water in the form of their neutral salts with inorganic or organic anions. In particular, the acid salts which form by adding on an equivalent of an inorganic or organic acid to the external amino group, show a solubility in water which is higher than the water-solubility of the salts of comparable known dyestuff cations without amino groups outside the color-producing system.

The new dyestuff cations are suitable for dyeing very different materials, such as cotton mordanted with tannic acid, cellulose acetate, linear polyamides, urethanes and esters. Above all it is possible to obtain on polymers and copolymers of acrylonitrile or dicyanoethylene, very fast dyeings in shades of color not hitherto obtainable.

The following examples will further illustrate this invention but the invention is not restricted to these examples. The parts specified in the examples are parts by weight and the percentages are percentages by weight.

*Example 1*

A solution of 18 parts of N.N.N'-trimethyl-N'-phenyl-ethylene diamine in 100 parts of methanol is added to a solution of 22 parts of 3-methylbenzthiazolone-2-hydrazone hydrochloride in 300 parts of water and then, while stirring at room temperature, 240 parts of a 35% aqueous solution of ferric chloride and 160 parts of a 50% aqueous sodium acetate solution are dripped in simultaneously. After the reaction, 40 parts of a 5-normal hydrochloric acid and 200 parts of a saturated aqueous potassium chloride solution are added. The precipitate is filtered off, washed with potassium chloride solution and dried at 50° C. in vacuo. 41 parts of the salt of the dyestuff cation of the formula:

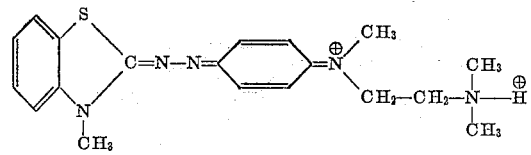

and the chloride anion are obtained. It dissolves in water with a blue-violet color and dyes polyacrylonitrile fibers very fast reddish blue shades from a sulfuric acid bath.

By using other inorganic or organic acids for the precipitation instead of hydrochloric acid, other salts of the dyestuff cation are obtained, for example the bromide, sulfate, phosphate, trichlorizincate or methosulfate.

The following dyestuff cations which also give fast dyeings on polyacrylonitrile, can be obtained in a corresponding way:

| Example | Formula | Dyeing on polyacrylonitrile fibers |
|---|---|---|
| 2 | | blue-violet. |
| 3 | | reddish blue. |
| 4 | | Do. |
| 5 | | blue. |
| 6 | | greenish blue. |

| Example | Formula | Dyeing on polyacrylonitrile fibers |
|---|---|---|
| 7 | (structure) | blue. |
| 8 | (structure) | reddish blue. |

Example 9

18 parts of 2-amino-6-methoxybenzthiazole are diazotized in the usual way with nitrosyl sulfuric acid and coupled with a sulfuric acid aqueous solution of 24 parts of N.N.N'-triethyl-N'-phenylethylene diamine. When coupling is ended, it is neutralized with aqueous sodium hydroxide solution, filtered by suction and washed on the filter. The dried dyestuff is dissolved in 250 parts of dimethyl formamide and, while stirring, 13.5 parts of dimethyl sulfate are added. It is heated to 90° to 100° C. until a pure blue solution has been formed and then poured into 2000 parts of water. By adding sodium chloride, the dyestuff salt is deposited, isolated and dried. 56 parts of the salt of the dyestuff cation of the formula:

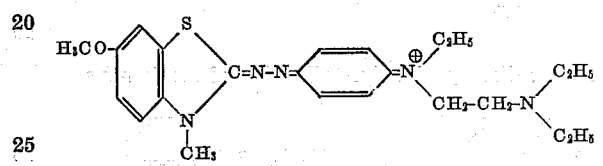

and the chloride anion are obtained. It dissolves in water with a pure blue color. From a neutral, acetic acid or sulfuric acid dyebath, very pure greenish blue dyeings which exhibit excellent fastness to light and wet treatment are obtained on a fabric of the copolymer of 95% of acrylonitrile and 5% of butyl methacrylate.

A tinctorially equivalent dyestuff is obtained by carrying out the methylation in xylene or chlorbenzene.

The dyestuffs in the following table, which give fast dyeings on polyacrylonitrile, can be obtained in a corresponding way:

| Example | Formula | Dyeing on polyacrylonitrile fibers |
|---|---|---|
| 10 | (structure) | blue-violet. |
| 11 | (structure) | reddish blue |
| 12 | (structure) | greenish blue. |
| 13 | (structure) | Do. |
| 14 | (structure) | turquoise. |

What we claim is:

1. The diazacyanine dyestuff cation of the formula:

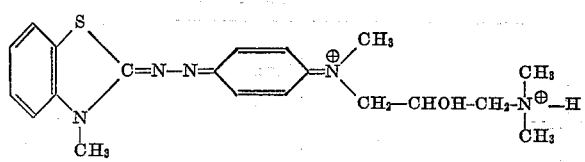

2. The diazacyanine dyestuff cation of the formula:

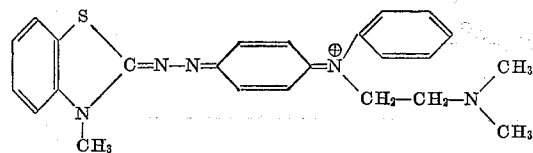

3. The diazacyanine dyestuff cation of the formula:

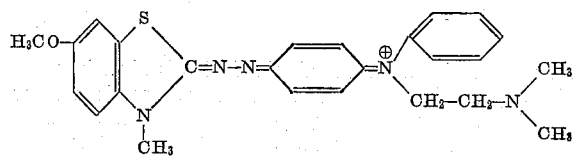

4. The diazacyanine dyestuff cation of the formula:

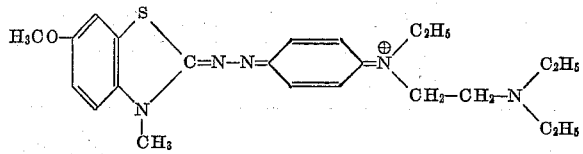

5. The diazacyanine dyestuff cation of the formula:

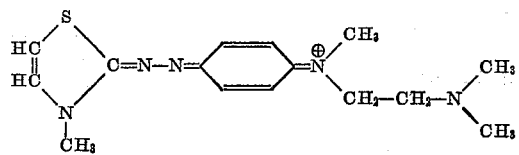

6. The diazacyanine dyestuff cation of the general formula

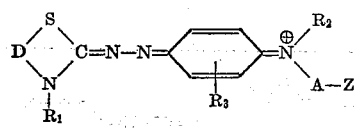

in which: D represents a divalent radical forming together with the structure

of the above formula a member selected from the group consisting of thiazole, benzthiazole, thiazole substituted on a carbon atom in D of the above formula by a member selected from the group consisting of methyl, ethyl, phenyl, nitrophenyl, nitro and cyano, and benzthiazole substituted on a carbon atom in D of the above formula by a member selected from the group consisting of methyl, ethyl, methoxy, ethoxy, phenylamino, acetylamino and chloro; $R_1$ represents lower alkyl with up to 5 carbon atoms; $R_2$ represents a member selected from the group consisting of hydrogen, phenyl, lower alkyl with up to 5 carbon atoms, monohydroxy-lower alkyl with up to 5 carbon atoms and further members in which $R_2$ is a divalent radical selected from the group consisting of —CH=CH—, —CH$_2$—CH$_2$—CH$_2$— and

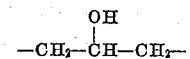

said divalent radical being connected at one end to the nitrogen atom as shown in the above formula and at the other end to the quinoid ring adjacent to the position occupied by said nitrogen atom; $R_3$ represents a member selected from the group consisting of hydrogen and lower alkyl with up to 4 carbon atoms; A represents a divalent radical selected from the group consisting of lower alkylene with up to 5 carbon atoms and monohydroxy-lower alkylene with up to 5 carbon atoms; and Z represents a member containing up to 5 carbon atoms selected from the group consisting of —NH$_2$, secondary and tertiary lower alkylamino and monohydroxy-lower alkylamino, pyrrolidino, morpholino and piperidino.

References Cited in the file of this patent
UNITED STATES PATENTS 2,441,612   Argyle et al. _____ May 18, 1948